(12) United States Patent
Kendricks

(10) Patent No.: US 7,433,571 B2
(45) Date of Patent: Oct. 7, 2008

(54) CABLE BUNDLING AND ORGANIZING SYSTEM

(76) Inventor: David Kendricks, 10630 Wiles Rd., Coral Springs, FL (US) 33076

( * ) Notice: Subject to any disclaimer, the term of this patent is extended or adjusted under 35 U.S.C. 154(b) by 0 days.

(21) Appl. No.: 11/222,355

(22) Filed: Sep. 8, 2005

(65) Prior Publication Data

US 2007/0053646 A1 Mar. 8, 2007

(51) Int. Cl.
G02B 6/36 (2006.01)
G02B 6/00 (2006.01)

(52) U.S. Cl. .......................... 385/136; 385/86
(58) Field of Classification Search .................. None
See application file for complete search history.

(56) References Cited

U.S. PATENT DOCUMENTS

| | | | | |
|---|---|---|---|---|
| 3,833,992 A | * | 9/1974 | Moulin | 29/235 |
| 6,653,568 B1 | * | 11/2003 | Davis | 174/68.3 |
| 6,705,002 B1 | * | 3/2004 | Dukes et al. | 29/825 |
| 6,809,266 B1 | * | 10/2004 | Hoi et al. | 174/135 |
| 6,993,237 B2 | * | 1/2006 | Cooke et al. | 385/135 |
| 2005/0265668 A1 | * | 12/2005 | Martin | 385/86 |

* cited by examiner

Primary Examiner—Tina M Wong
(74) Attorney, Agent, or Firm—Malin Haley Dimaggio Bowen & Lhota PA

(57) ABSTRACT

A cable organizing and bundling sleeve and sleeve dispensing tool for use in installing the sleeve around a plurality of cables provides a system for combining, protecting, and organizing multiple cables and hoses into one compact bundle. An elongate, radially elastic tubular sleeve of suitable size is provided for bundling a plurality of cables, and sleeve-dispensing tool is provided for dispensing the sleeve into surrounding relation with the cables. The dispensing tool preferably comprises a generally rigid tubular dispenser having one radially outwardly flared end and a slot that runs along the entire length thereof. The dispenser functions to receive a sleeve thereon in a longitudinally compact, radially stretched-open configuration such that a plurality of cables may be inserted therethrough. Once the cables are inserted completely through the dispenser, the user slides one sleeve end from the dispenser, secures the end on the cable bundle with a suitable clip or fastener, stretches the sleeve over the cable bundle and secures the opposing sleeve end in spaced relation with the first sleeve end with a suitable clip or fastener. The dispenser is removed from the cable bundle by passing the cables through the longitudinal slot formed in the dispenser body. The sleeves are preferably provided in a plurality of colors and lengths suitable for particular applications.

9 Claims, 5 Drawing Sheets

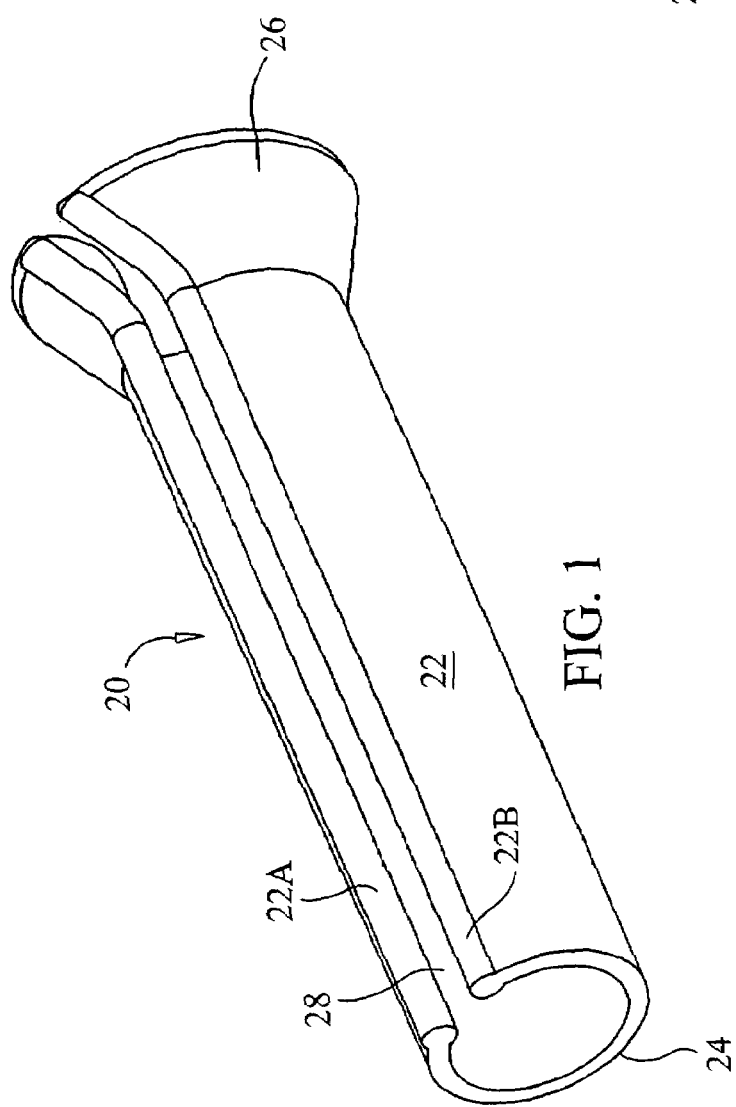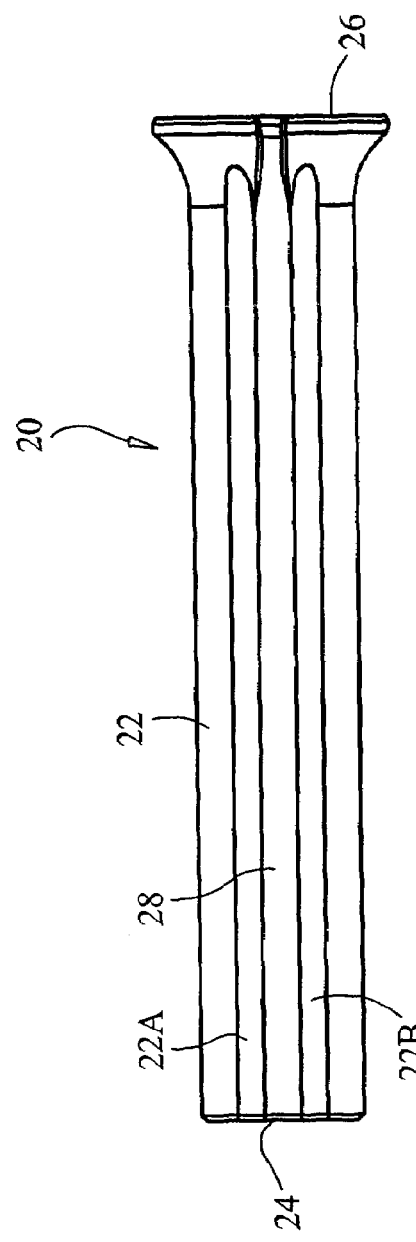

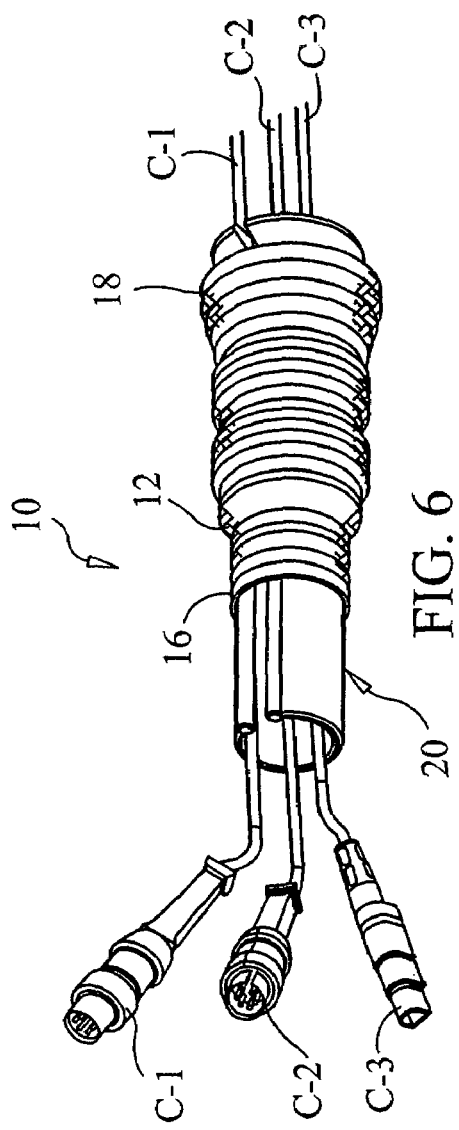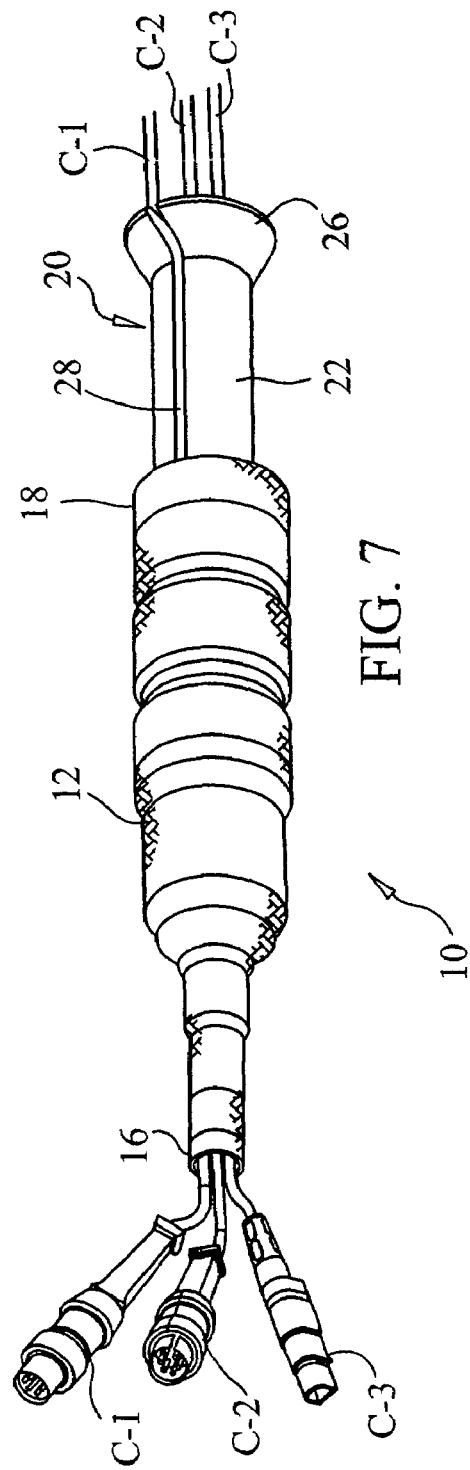

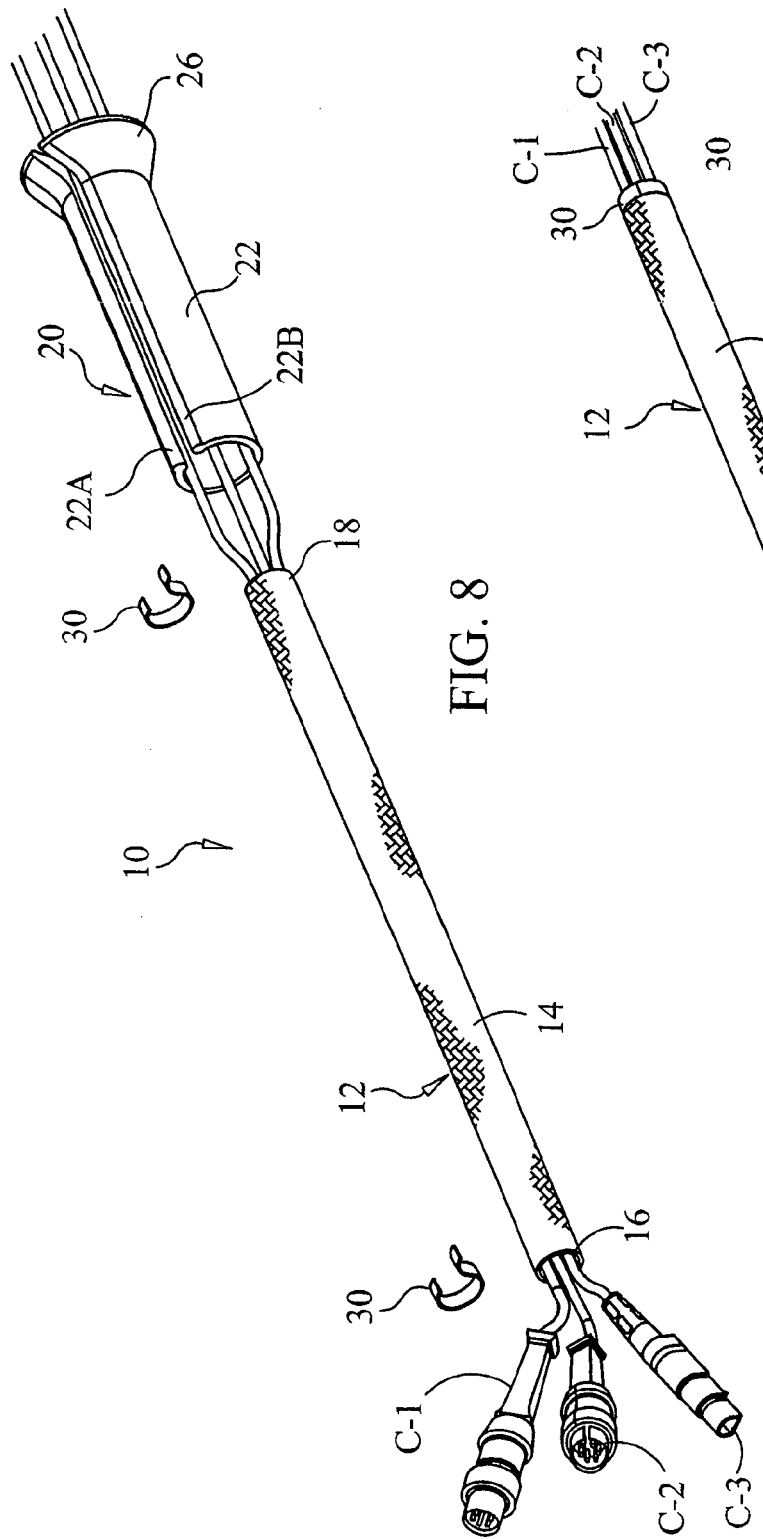
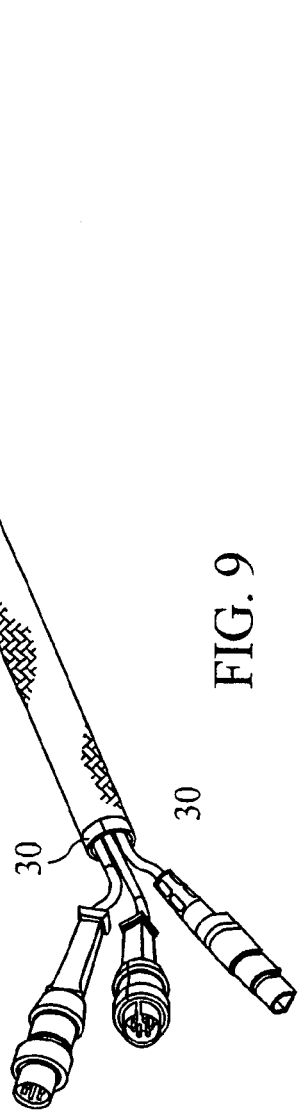
FIG. 8
FIG. 9

CABLE BUNDLING AND ORGANIZING SYSTEM

CROSS REFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

The present invention relates to wire and cable bundling devices, and more particularly to an elastic sleeve and installation apparatus for use in installation of the sleeve on a plurality of wires and cables to retain and organize wires and cables.

2. Description of Related Art

A wide array of devices are known for use in retaining the various wires, cables, and cords, used in connection with modern electrical apparatus. The need for such cable bundling and organizing devices has increased with advancements associated with modern technology. The terms "wires," "cables," and "cords," and "hoses" are considered as equivalents for the purposes of the instant application, and are used interchangeably herein.

The background art reveals simple cable tie wraps for bundling cables. An example of such a wrap is shown in U.S. Pat. No. 6,543,094 issued to D'Addario. The device comprises an elastic cord defining a loop attached to a cord connection end of the coupling body.

Other cable bundling devices include an elongate tubular structure adapted for installation in surrounding relation with a plurality of cables. A significant aspect of these devices involves installing the bundling device around a plurality of cables. For example, flexible cable bundling sleeves that are manually attachable about electrical cables using a zipper running the length of the bundling sleeves are disclosed in the following U.S. Pat. No. 2,585,054 (Stachura), U.S. Pat. No. 2,960,561 (Plummer), and U.S. Pat. No. 3,038,558 (Plummer). In addition, U.S. Pat. No. 5,600,098, issued to Kazaks, discloses an organizer for securing a plurality of insulated electrical conductors, such a PC interconnect and power cables, that comprises a single piece of thin, flat, flexible fabric having a rectangular configuration with a zipper, straps, or hook and loop fastening material used to fasten the edges.

U.S. Pat. No. 6,653,568, issued to Davis, discloses a flexible harness wrap having a longitudinal slot running from end to end along the length thereof. The wrap is made of a resilient material biased to a generally cylindrical configuration. The harness wrap forms a generally cylindrical structure while the slot forms a longitudinally separable seam that allows for the formation of an opening for insertion of cables. U.S. Pat. No. 6,809,266, issued to Hoi et al, discloses a cable organizer fabricated in a similar fashion.

The background art further reveals sleeves for use in other applications. For example, U.S. Pat. No. 5,849,379, issued to Gladfelter, discloses a split sleeve for insulation of heat generating components, such as an exhaust gas recirculation device. The split sleeve comprises an outer layer of knitted woven yarn and a metal wire skeleton defining a C-shaped cross-sectional configuration to allow the sleeve to be wrapped about a component.

The devices disclosed in the prior art, however, are overly complex, difficult to install, and far to rigid to allow the enclosed cables to move and bend freely. Accordingly, there exists a need for an improved cable bundling sleeve.

BRIEF SUMMARY OF THE INVENTION

The present invention overcomes the limitations and disadvantages present in the art by providing a cable organizing and bundling sleeve and sleeve dispensing tool for use in installing the sleeve around a plurality of cables. The present invention thus provides a system for combining, protecting, and organizing multiple cables and hoses into one compact bundle. A cable bundling sleeve in accordance with the present invention comprises an elongate, radially elastic tubular sleeve of suitable size for bundling cables. A sleeve-dispensing tool is provided for dispensing the sleeve into surrounding relation with a plurality of cables and hoses. The installation tool preferably comprises a generally rigid tubular dispenser having one radially outwardly flared end and a slot that runs along the entire length thereof. The dispenser functions to receive a sleeve thereon in a longitudinally compact, radially stretched-open configuration such that a plurality of cables may be inserted therethrough. Once the cables are inserted completely through the dispenser, the user slides the sleeve from the dispenser over the cables. The dispenser is removed from the cable bundle by passing the cables through the longitudinal slot formed in the dispenser body. The sleeve is then stretched to a desired length and secured at opposing end with a suitable clip or band. The sleeves are preferably provided in a plurality of colors and lengths suitable for particular applications.

Accordingly, it is an object of the present invention to provide an improved system for organizing a plurality of cables.

Another object of the present invention is to provide such a cable organizing system where a flexible tubular sleeve is used to bundle a plurality of cables.

Still another object of the present invention is to provide a cable organizing system with a flexible knit sleeve that does not require a longitudinal separable seam.

Yet another object of the present invention is to provide a cable organizing system having a sleeve dispenser adapted for installing a cable bundling sleeve on a plurality of cables.

In accordance with these and other objects, which will become apparent hereinafter, the instant invention will now be described with particular reference to the accompanying drawings.

DETAILED DESCRIPTION OF THE INVENTION

FIG. 1 is a perspective view of a dispenser tube for a cable organizing system in accordance with the present invention;

FIG. 2 is a top view thereof;

FIG. 6 depicts the cables inserted through the dispenser tube;

FIG. 7 illustrates the cable sleeve partially deployed from the dispenser tube onto the cables;

FIG. 8 illustrates the cable sleeve deployed onto the cables; and

FIG. 9 illustrates secured attachment of the cable sleeve ends to the bundled cables.

DETAILED DESCRIPTION OF THE INVENTION

Figure 3:
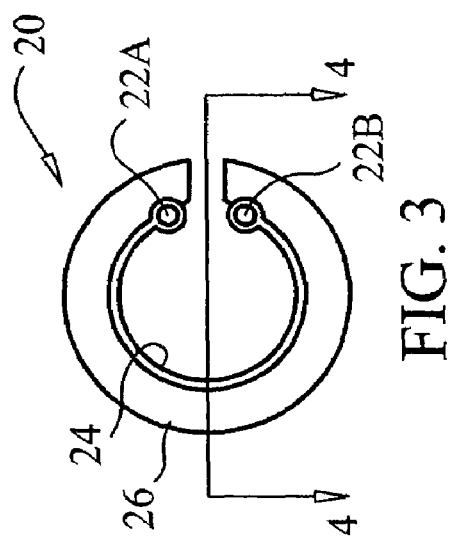
FIG. 3 is an end view thereof.
Figure 4:
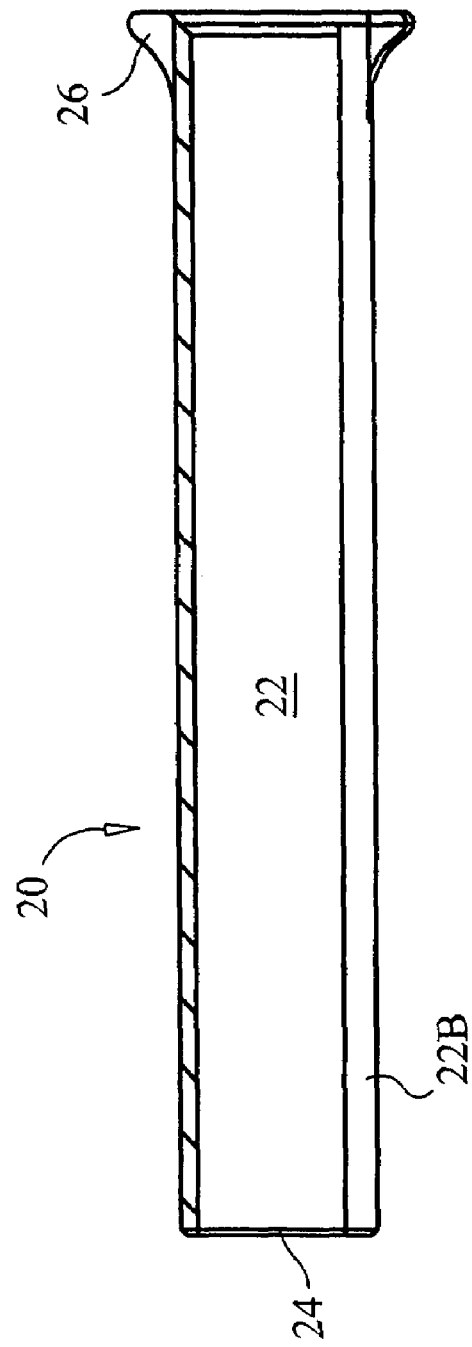
FIG. 4 is a sectional view thereof taken along section line 4-4 of FIG. 3.

With reference now to the drawings, FIGS. 1-9 depict a preferred embodiment of a cable bundling system, generally referenced as 10, in accordance with the present invention. Cable bundling system 10 includes a cable organizing and bundling sleeve 12 and sleeve dispensing tool 20 for use in installing the sleeve around a plurality of cables, generally referenced as C-1, C-2, and C-3, to combine, protect, and organize multiple cables and hoses into a compact bundle. Cable bundling sleeve 12 preferably comprises an elongate, radially elastic tubular sleeve of suitable size for bundling cables. Sleeve 12 is preferably fabricated from a flexible material such as woven or knitted fabric. The fabric may be formed of natural (e.g. cotton) or synthetic fiber (e.g. nylon), or any other suitable material. Sleeve 12 is formed generally as a tubular sleeve having a body 14 defining opposing open ends, referenced as 16 and 18 respectively. Sleeve 12 is further fabricated such that longitudinal stretching of the sleeve results in radial reduction of the sleeve body. The present invention contemplates providing sleeves in a variety of colors to allow the user to organize cables in color-coded bundles. Sleeve 12 is further provided with at least two retainer members 30 for securing the sleeve ends 16 and 18 in place once installed as further discussed herein below.

As best depicted in FIGS. 1-4, the present invention further provides a sleeve-dispensing tool 20 for use in dispensing sleeve 12 into surrounding relation with a plurality of cables. Dispensing tool 20 preferably comprises a generally hollow rigid body or any suitable cross-sectional shape. In a preferred embodiment, dispensing tool 20 is formed by a generally hollow cylindrical body wall 22 defining an open first end 24, an open second end 26. The tubular body second end 26 preferably flares radially outward for reasons discussed more fully herein below. Body wall 22 further defines a slot 28, running the entire length thereof from first end 24 to second end 26, and bounded by opposing edges, 22A and 22B, formed by body wall 22. Edges 22A and 22B are preferably sufficiently spaced to allow for cables to pass therebetween, and may be rounded. As discussed above, the present invention further contemplates use of dispensing tools of any suitable cross-sectional shape, including square, rectangular, polygonal, or any other suitable cross-section desirable for receiving cables and cable end connectors of any conventional or unconventional shape or size.

Figure 5:
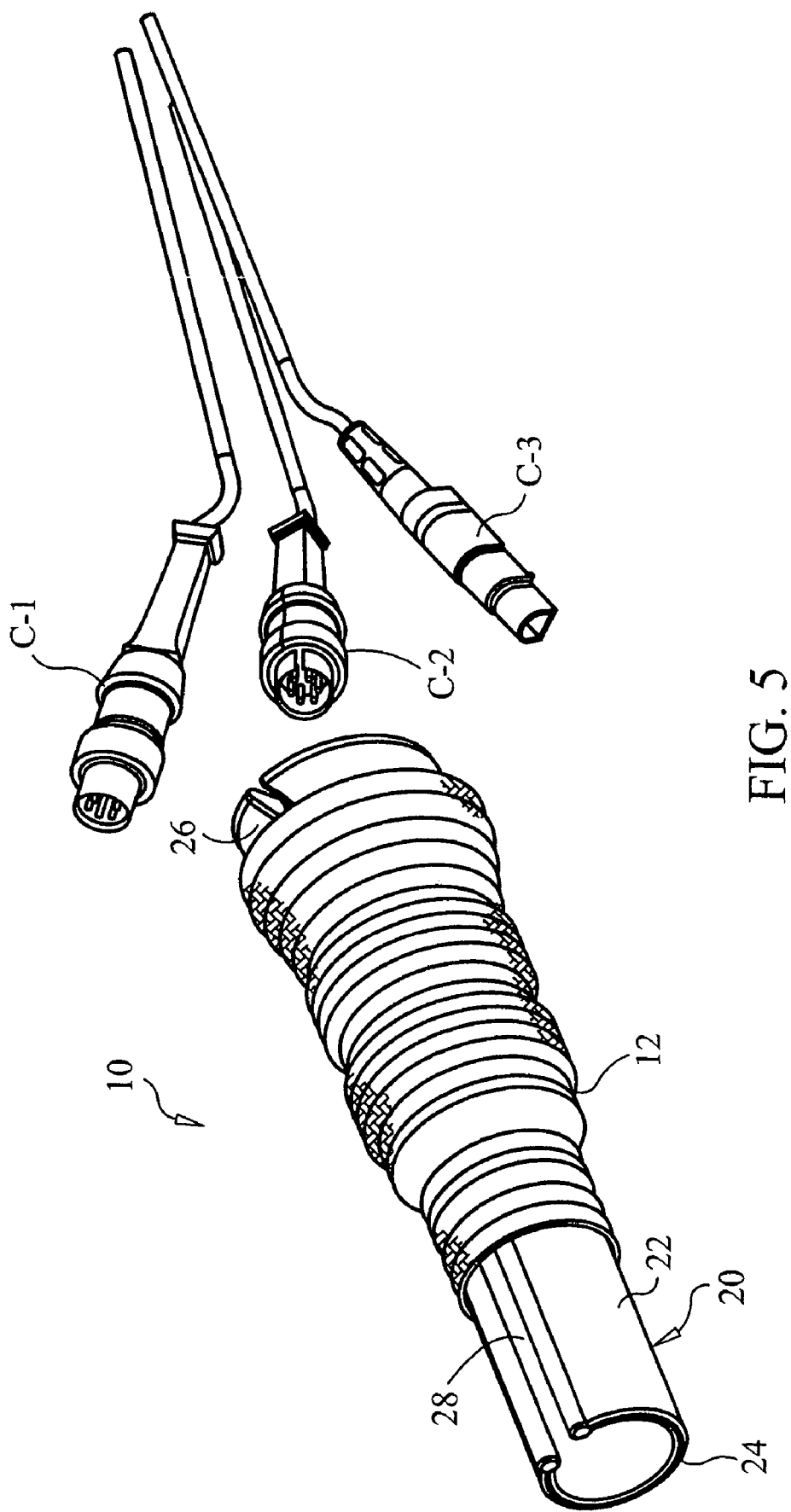
FIG. 5 is a perspective view depicting a cable sleeve mounted on a dispenser tube prior to the insertion of a plurality of cables through the dispenser tube.

As best depicted in FIGS. 5-9 a cable bundling system according to the present invention functions as follows. First, end 18 of sleeve 12 is radially stretched and placed onto end 24 of sleeve dispensing tool 20. Next, sleeve 12 is slid onto dispensing tool 20 and compactly bunched such that sleeve ends 16 and 18 are both disposed on dispensing tool body 22 in a radially stretched open configuration as best depicted in FIG. 5. As seen in FIG. 5, second end 26 flares radially outward to prevent the sleeve from sliding of the dispenser. Then, as best depicted in FIG. 6, cables C-1, C-2, and C-3 are then inserted completely through sleeve dispensing tool 20 by insertion through dispensing tool end 26 until the cable end project from dispensing tool end 24. Once the cables are inserted completely through the dispenser as depicted in FIG. 6, sleeve end 16 is slid off of dispensing tool 20 and secured proximal the cable end connector using a retainer 30, thus allowing the user to slide the remaining portion of sleeve 12 from dispensing tool 20 over the cables as depicted in FIG. 7. Once the sleeve is fully dispensed onto the cables and stretched, the opposing sleeve end 18 may be secured to the sleeve using a second end retainer 30. Dispensing tool 20 may then be removed from the cables by passing cables C-1, C-2, and C-3, through longitudinal slot 28 as best illustrated by FIGS. 8 and 9. As the cables pass through slot 28, annular edges 22A and 22B of body wall 22 function as guide structures. Cable dispensing tool 20 is thus free for use in the dispensing of additional cable sleeves on other cable bundles as described above.

Once the dispensing tool 20 is removed, sleeve 12 is then stretched to a desired length along the cables. As discussed above, stretching of sleeve 12 by longitudinal separation of sleeve ends 16 and 18 causes sleeve body 14 to radially constrict snugly around the cables thereby minimizing the overall diameter of the cable bundle. Once appropriately stretched, sleeve 12 is secured proximal opposing sleeve ends 16 and 18 with a suitable retainer 30 as best depicted in FIGS. 8 and 9. Retainers 30 may be strap members having ends adapted with hook and loop fastening material to allow for tightening and connection. Retainers 30 may also be bundling straps, similar to those disclosed and shown in U.S. Pat. No. 6,543,094 issued to D'Addario, or any other suitable retainer, or clips. In the alternative, the sleeve ends may have an elastic hem. As should be apparent, dispensing tool 20 is also useful in unbundling the cables by essentially reversing the installation process described above.

As noted above, sleeves 12 are preferably provided in a plurality of colors and lengths suitable for particular applications. Accordingly, the user is provided with a system wherein cables may be bundled using color-coded sleeves that allow the user to visually identify specific cable bundles. This feature is considered particularly significant in bundling the multitude of cables, tubes, and hoses, often used simultaneously in providing patient care in medical environments. The color-coded sleeve feature is also useful in bundling the multitude of electrical cables used in modern computer systems, home theatre systems, and the like.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A cable bundling system comprising:

an elongate, radially elastic sleeve having opposing open ends;

a generally hollow sleeve dispenser defining a longitudinal opening and terminating at opposing open ends, and a peripheral wall defining a longitudinal slot extending through said ends;

said dispenser sized for insertion within said sleeve with said opposing sleeve ends each disposed thereon;

said sleeve being dispensable from said dispenser in surrounding relation with a plurality of cables insertedly passed through said dispenser open ends, and said dispenser is removable from said inserted cables by passing said cables through said dispenser longitudinal opening.

2. A cable bundling system according to claim 1, further including means for retaining said cable sleeve opposing ends in a radially compact configuration around said cables.

3. A cable bundling system according to claim 1, further including a plurality of sleeves including sleeves fabricated of at least two different colors.

4. A cable bundling system according to claim 1, wherein said dispenser includes one end thereof flared radially outwardly.

5. A cable bundling system according to claim 1, wherein said dispenser longitudinal opening is defined by arcuate longitudinal edges.

6. A cable bundling system comprising:
   an elongate, radially elastic sleeve having opposing open ends;
   a generally cylindrical sleeve dispenser defining opposing open ends and having a generally cylindrical wall defining a longitudinal slot extending completely through said ends, one of said dispenser ends being radially flared outwardly;
   said dispenser radially sized for receiving said sleeve thereon with said sleeve forced to a radially stretched configuration;
   said dispenser open ends sized for receiving a plurality of cables inserted therethrough;
   said sleeve being dispensable from said dispenser onto a plurality of cables insertedly passed through said dispenser open ends, and said dispenser is removable from said inserted cables by passing said cables through said dispenser longitudinal slot; and
   means for retaining said opposing sleeve ends in spaced surrounding relation on said cables.

7. A cable bundling system according to claim 6, further including a plurality of sleeves including sleeves fabricated of at least two different colors.

8. A cable bundling system according to claim 6, wherein said slot is defined by arcuate longitudinal edges.

9. A method for bundling and organizing a plurality of cables, said method including the steps of:
   (a) providing an elongate, radially elastic sleeve having opposing open ends;
   (b) providing a generally rigid hollow sleeve dispenser defining first and second opposing open ends and a longitudinal slot extending entirely through said ends, said dispenser radially sized for receiving said sleeve thereon with said sleeve forced to a radially stretched configuration, said dispenser further including a second radially enlarged flared end for preventing said sleeve from sliding off of said dispenser;
   (c) sliding said sleeve onto said dispenser such that said opposing sleeve ends are generally disposed between said dispenser first and second ends;
   (d) inserting a plurality of cables completely through said dispenser;
   (e) dispensing said sleeve from said dispenser first end in surrounding relation with said plurality of cables;
   (f) removing said dispenser removable from said inserted cables by passing said cables through said dispenser longitudinal slot; and
   (g) retaining said sleeve opposing ends in spaced surrounding relation on said cables.

\* \* \* \* \*